(12) United States Patent
Haschke et al.

(10) Patent No.: US 11,976,725 B2
(45) Date of Patent: May 7, 2024

(54) PARKING LOCK FOR A MOTOR VEHICLE AND METHOD FOR OPERATING A PARKING LOCK

(71) Applicant: Schaeffler Technologies AG & Co. KG, Herzogenaurach (DE)

(72) Inventors: Christoph Haschke, Heroldsbach (DE); Matthias Feuerbach, Würzburg (DE); Christoph Thuerauf, Nuremberg (DE); Wilhelm Boehm, Fürth (DE); Klaus Kraemer, Lenkersheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 27 days.

(21) Appl. No.: 17/780,540

(22) PCT Filed: Dec. 17, 2020

(86) PCT No.: PCT/DE2020/101073
§ 371 (c)(1),
(2) Date: May 27, 2022

(87) PCT Pub. No.: WO2021/121484
PCT Pub. Date: Jun. 24, 2021

(65) Prior Publication Data
US 2023/0349464 A1 Nov. 2, 2023

(30) Foreign Application Priority Data
Dec. 17, 2019 (DE) ...................... 10 2019 134 730.0

(51) Int. Cl.
*F16H 63/34* (2006.01)

(52) U.S. Cl.
CPC ...... *F16H 63/3466* (2013.01); *F16H 63/3433* (2013.01); *F16H 63/3475* (2013.01); *F16H 63/3491* (2013.01)

(58) Field of Classification Search
CPC .. F16H 63/3466; F16H 63/3475; F16H 63/63; F16H 63/3491; F16H 63/3433
See application file for complete search history.

(56) References Cited

U.S. PATENT DOCUMENTS

2007/0283735 A1\* 12/2007 Schweiher ............ F16H 63/483
70/245
2008/0277236 A1\* 11/2008 Ruhringer ........... F16H 63/3491
192/219.6
2014/0110216 A1\* 4/2014 Pollack ............... F16H 63/3483
192/219.4

FOREIGN PATENT DOCUMENTS

CN 105387203 A 3/2016
CN 106523698 A 3/2017
(Continued)

*Primary Examiner* — Stacey A Fluhart

(57) ABSTRACT

An electromechanical parking lock for a motor vehicle includes a locking element for reversible engagement in a parking lock wheel, an actuating element that can be preloaded by an actuating spring in order to insert the locking element into the parking lock wheel, an electric motor with an actuating unit for moving the actuating element out of the locked position (P) against the spring force of the actuating spring into an unlocked position (nP), and a solenoid that, in the unlocked position (nP), holds the actuating element pre-loaded via a securing element. The parking lock has an emergency locking position (Not-P) in which the parking lock is unlocked and in which the securing element can be released by the electric motor without changing the state of the solenoid so that the locked position (P) can be assumed.

19 Claims, 1 Drawing Sheet

(56) References Cited

FOREIGN PATENT DOCUMENTS

| | | | |
|---|---|---|---|
| CN | 107917189 A | 4/2018 | |
| DE | 19834074 A1 | 2/2000 | |
| DE | 102006053762 A1 | 6/2007 | |
| DE | 102006022963 A1 | 11/2007 | |
| DE | 10044159 B4 | 12/2009 | |
| DE | 102010003508 A1 | 10/2011 | |
| DE | 102012012672 A1 * | 1/2013 | ......... F16H 63/3441 |
| DE | 102012210571 A1 | 12/2013 | |
| DE | 102016214683 A1 | 2/2018 | |
| DE | 102017103317 A1 | 8/2018 | |
| DE | 102018129314 A1 | 10/2019 | |
| EP | 1228328 B1 | 1/2006 | |
| WO | WO-2016110491 A1 * | 7/2016 | |

* cited by examiner

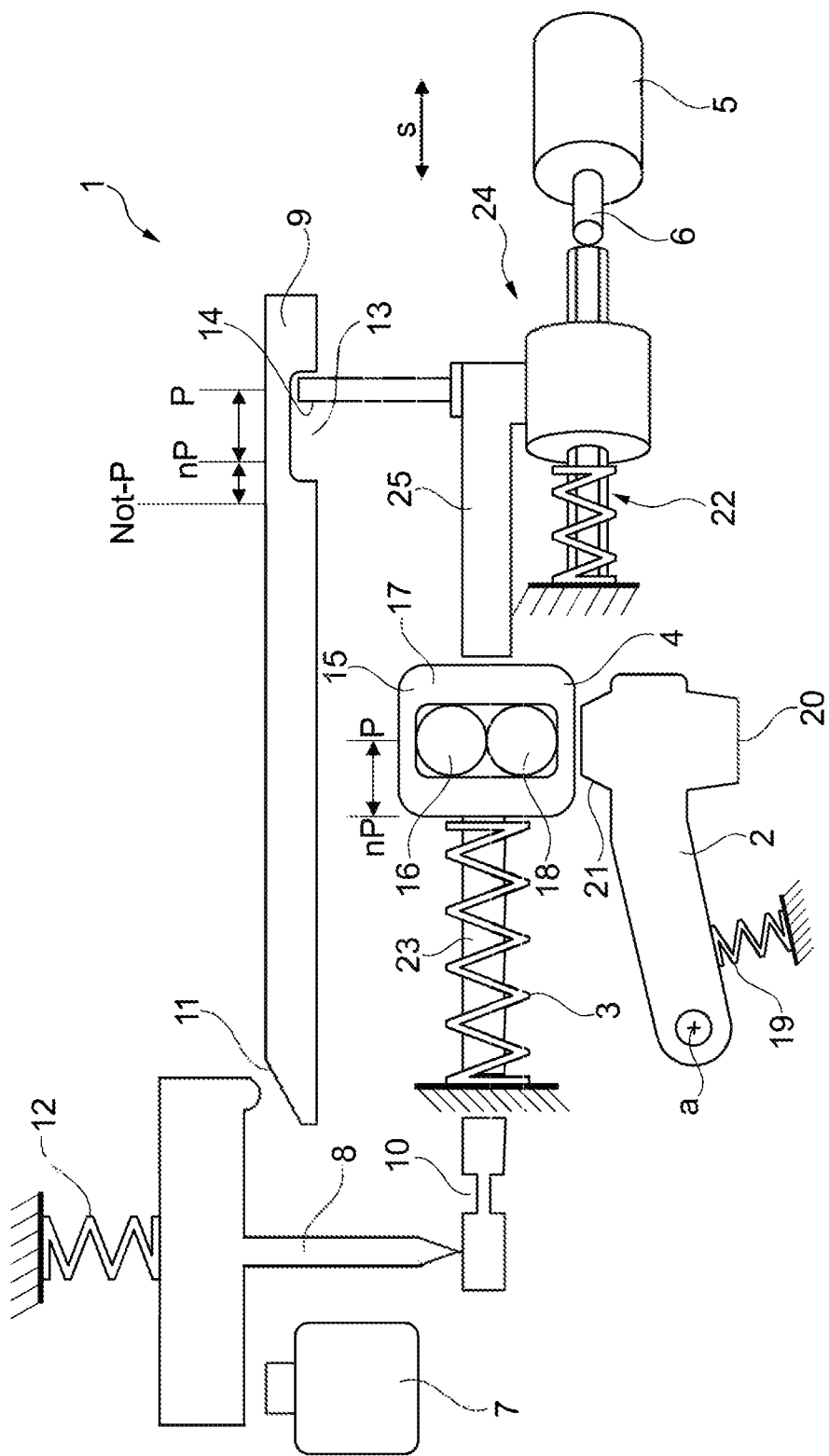

PARKING LOCK FOR A MOTOR VEHICLE AND METHOD FOR OPERATING A PARKING LOCK

CROSS-REFERENCE TO RELATED APPLICATIONS

This application is the United States National Phase of PCT Appln. No. PCT/DE2020/101073 filed Dec. 17, 2020, which claims priority to German Application No. DE102019134730.0 filed Dec. 17, 2019, the entire disclosures of which are incorporated by reference herein.

TECHNICAL FIELD

The present disclosure relates to a parking lock for a motor vehicle including a pawl for reversible engagement in a parking lock wheel, a spring-loaded actuating element in order to insert the pawl into the parking lock wheel, an actuator for moving the actuating element and a coupling element between the actuator and the actuating element, and to a method for operating such a parking lock.

BACKGROUND

Many motor vehicle transmissions feature parking locks, which are mechanically actuated via a cable connected to a lever. Some new developments also include electro-hydraulic or electric motor actuation, in which the lever is controlled electrically.

The electromotive actuators provided for actuating the parking locks are usually arranged outside of the transmission. For this purpose, they are bolted to the transmission housing wall, for example, and connected directly to a parking lock shaft in the transmission. Due to the modular design, the same actuators can be used for different transmissions, which promises a larger number of units and thus cost advantages for the actuator in the case of different transmission variants in a model series or also in different vehicles.

A vehicle with a parking lock must be able to be parked safely on all road gradients even in the event of an on-board power supply failure of the vehicle. Vehicles with an electric parking brake and an electric actuator therefore require either a second, redundant power supply or a device that automatically engages the parking lock in the event of an on-board power supply failure.

EP 1 228 328 B1 discloses a transmission actuator system with an electromagnetic clutch which, in the event of a power failure, is only decoupled by a spring element and the shift position "P" of the transmission and the parking lock are engaged as a result. Other parking locks are known from DE 100 44 159 B4 and DE 10 2010 003 508 A1.

DE 10 2017 103 317 A1 discloses a parking lock with a worm shaft and a worm wheel, wherein the worm shaft is pre-loaded by a spring, which in turn is held pre-loaded by an electromagnet as a holding means for a steel disk connected to the spring. In the event of an impermissible voltage drop in the on-board power supply of the vehicle, the magnetic field collapses and the spring locking the pawl of the parking lock is released. After this spring has been released, it must be loaded again in a reset operation. Furthermore, the steel disk must be repositioned in front of the electromagnets, which requires a lever mechanism as a resetting device.

The additional resetting device is costly, further requires a substantial holding force, and its state during the reset is difficult to detect.

In the case of hydraulically actuated parking locks, it is known from DE 10 2012 210 571 A1 or DE 198 34 074 A1, to prevent unintentional disengagement of the parking lock in the event of a fault. Due to the hydraulic pressure decreasing over time or in case of malfunction, it is ensured that the parking lock cannot be unintentionally disengaged. If the hydraulic pressure cannot be built up, the parking lock thus remains in the locked position.

This safety concept cannot be implemented in this way with electric parking locks. If an electric motor fails, the parking lock remains in the position it was last in. A second electric motor can be installed to protect against this failure, but this is costly and unsuitable in the event of a power supply failure. A generic parking lock is known from DE 10 2006 053 762 A1. Further parking locks can be found in DE 10 2018 129 314 A1 and DE 10 2006 022 963 A1.

Generally, the parking lock is pre-loaded against a mechanical spring in the unlocked position. To prevent the electric motor from being constantly loaded, a solenoid holds the actuating mechanism for the locking pawl in position. The solenoid requires much less energy and can be operated locally via an energy storage device (capacitor). However, if the solenoid malfunctions, it is no longer possible to safely engage the parking lock.

SUMMARY

The present disclosure provides a method that enables the parking lock to be engaged safely even if one of the electrical components fails.

An electromechanical parking lock for a motor vehicle includes a locking element for reversible engagement in a parking lock wheel, an actuating element that can be pre-loaded by an actuating spring in order to insert the locking element into the parking lock wheel, an electric motor having an actuating unit for moving the actuating element out of the locked position against the spring force of the actuating spring into an unlocked position, and a solenoid that, in the unlocked position, holds the actuating element pre-loaded via a securing element. The parking lock has an emergency locking position in which the parking lock is unlocked and in which the locking element can be moved by the electric motor even if the solenoid is inoperable and thus without the solenoid being effective. Moving the securing element from its locked position can release the pre-load on the actuating element, allowing it to move to the locked position and thus lock the parking lock.

The parking lock according to the disclosure thus enables redundant activation for an electromechanical parking lock. The redundant activation can be effective in case the electric motor for operating the parking lock fails, either due to a defect or due to insufficient voltage of the on-board power supply. This means that the parking lock can be safely locked as soon as the vehicle has come to a standstill, even in an emergency.

There are two operating modes: normal operation and emergency operation.

In normal operation, the parking lock is disengaged by means of the electric motor. It displaces an actuating unit from its home position, which acts on an actuating element against the force of two springs until the latter reaches the unlocked position. In the unlocked position, the actuating element is locked or otherwise held. The locking or securing can be released by a solenoid. As soon as the actuating element is secured in this way, the actuating unit is moved back by the electric motor.

The parking lock is engaged and thus activated by the solenoid. It releases the lock, whereby the actuating element, which was previously secured and pre-loaded by a spring, is released and the locking pawl presses against the parking lock wheel, thus activating the parking lock. Depending on the differential speed of the parking lock wheel to the actuating element, ratcheting can occur.

In emergency operation, two cases must be distinguished. In the first case, the solenoid fails and the parking lock should still be engaged. The actuating element is in the unlocked position, which initially cannot be released without the solenoid. To overcome the blockage, the electric motor can move the actuating unit to a third position, the emergency locking position. When moving to the emergency locking position, the electric motor as actuator for this purpose acts, for example, mechanically on the position of the solenoid or of a locking element that can actually be moved by the solenoid.

To do this, in one embodiment, it can move one of the components along a ramp contour. The locking element can thus be moved by both the solenoid and the electric motor. The electric motor thus forms the redundant activation option for the solenoid.

In a further embodiment, the electric motor can move the locking element only when moved between the unlocked position and the emergency locking position, but not during normal operation when moved between the unlocked position and the locked position. This decouples the electric motor during normal operation so that there is no interaction with the locking element, making it easy to adjust the holding force to be applied by the solenoid. There may be no coupling with the locking element when the parking lock is disengaged, so that the forces are not supported via the locking element and it cannot jam.

In the second case of emergency operation, the electric motor fails. To be able to still engage the parking lock in this case, the spring pre-load of the actuating element in the unlocked position can be released once by the solenoid. To ensure that this is also possible in the event of a failure of the on-board power supply, an emergency energy storage device for the solenoid, for example a capacitor, can be provided in one embodiment. Activation of the parking lock is always possible in this case. In contrast to the first failure case, however, the actuating unit does not move to the emergency locking position, but from the unlocked position to the locked position as in normal operation. Since the actuating unit, a spindle in one embodiment, is not self-locking and the adjusting nut is pre-loaded in the direction of the locked position, the parking lock can be activated by the solenoid even without the electric motor, even if only once.

The present parking lock thus enables an alternating redundancy so that the parking lock can be safely engaged both in the event of electric motor failure and solenoid failure. The advantage of alternating redundancy is that no further actuators have to be introduced, but the protection is transferred to existing components, the solenoid and the electric motor. This principle of reciprocity makes it possible to achieve a high degree of reliability while minimizing the number of additional components.

In a further embodiment, it is possible for the parking lock to also be activatable if the electric motor fails while moving to the unlocked position. This allows a safe vehicle state to be achieved in any parking lock state, including intermediate states. For this purpose, the actuating unit can be designed to be non-self-locking and spring-loaded.

For example, the electric motor can load an actuating unit with a spindle drive. The adjusting nut of the non-self-locking spindle drive is spring-loaded in the direction of the locked position so that the actuating unit is always automatically returned to the locked position.

The parking lock can be mounted as a pre-assembled unit in a transmission or on an axle. The parking lock wheel is, for example, a wheel with a toothing arranged on the main transmission shaft, a counter shaft or on a drive axle. The toothing can be designed as external toothing in which a locking pawl engages as an actuating element by pivoting radially inwards. Alternatively, it can be designed as part of an axial parking lock and the actuating element as a sliding sleeve, for example. The actuating spring pre-loads the actuating element so that the parking lock can be locked by the temporarily-stored potential energy both in a potential tooth-on-tooth position as well as in the event of failure of the electric motor. Furthermore, this allows the electric motor to be designed smaller than would be required for direct actuation.

The securing element effects that, when the parking lock is unlocked, it does not have to work permanently against the force of the actuating spring, so that the load on the electric motor is relieved. The securing element can be a pin or a plate. It temporarily locks or latches the actuating element in the unlocked position and may act perpendicular to the force of the actuating spring so that the securing element can be moved with as little force as possible. The securing element is moved by the solenoid when the parking lock is fully functional. The securing element may be spring loaded so that the solenoid only needs to be energized to actually release the unlocked position and thus lock the parking lock. The securing element is then moved to its release position. The securing element may be only moved back into its unlocked position when the unlocked position is to be assumed and held again.

The disclosure further relates to a method for operating a parking lock which includes a locking element for reversible engagement in a parking lock wheel, an actuating element that can be pre-loaded by an actuating spring in order to insert the locking element into the parking lock wheel, an electric motor having an actuating unit for moving the actuating element out of the locked position against the spring force of the actuating spring into an unlocked position, and a solenoid. In a first operating mode (normal mode), in which there is no fault, the actuating unit is only moved between an unlocked position nP and a locked position P. In a second operating mode in which the solenoid or a component affecting the operation of the solenoid fails, the actuating unit is operated between the unlocked position and an emergency locking position Not-P.

The emergency locking position may be arranged opposite to the locked position, so that the unlocked position lies spatially between the emergency locking position and the locked position. As a result, the two actuating paths do not overlap, so that the actuating unit can mechanically act on the solenoid or on components influenced by the solenoid, such as a securing element, on the travel path to the emergency locking position.

BRIEF DESCRIPTION OF THE DRAWINGS

The disclosure is described below with reference to a single schematically illustrated exemplary embodiment.

DETAILED DESCRIPTION

The single FIGURE shows a parking lock 1 in which a locking element in the form of a pawl 2 is movable relative to a parking lock wheel (not shown), for locking a motor vehicle. As a locking pawl, the pawl 2 can be pivoted about a pivot axis a and has a locking tooth 20 at its end facing away from the pivot axis a, with which it engages in one of the recesses of the locking teeth of the parking lock wheel and thus locks the parking lock 1. A return spring 19 secured to the parking lock housing and hooked onto the pawl 2 ensures that the pawl 2 does not fall unintentionally into one of the recesses of the parking lock wheel in the unlocked state due to gravity or as a result of vibrations.

The parking lock 1 is locked or unlocked by means of an actuating element 4, which is designed as a slide 15 with an actuating rod 23. The slide 15 has a slide housing 17 as a holder in which two radially offset rollers 16, 18 are held. One of the rollers 18 rolls on the pawl back 21, which forms a height profile, so that with linear displacement of the slide 15, the pawl 2 is rotated. The other roller 16 rolls on a reinforcement in the parking lock housing (not shown).

The box-shaped slide 15 is pre-loaded by the actuating spring 3 so that it moves the pawl 2 in the direction of the parking lock wheel without external force and locks the parking lock 1 (locked position, state P). The slide 15 can be displaced along the linear axis s.

To move the parking lock 1 from the locked position P to the unlocked position nP (unlocked), an electric motor 5 serves as the actuator. Its rotating electric motor shaft 6 is converted into a linear motion by a spindle drive.

In stationary operation and thus in both the unlocked position nP and the locked position P, the electric motor 5 is always in its same starting position. If the parking lock 1 is to be disengaged, the electric motor 5 pushes the slide 15 via an actuating unit 24 with a slide actuator 25 against the forces of the actuating spring 3 and an optional further spring 22 into the unlocked position nP, in which the parking lock 1 is held by the securing element 8. For this purpose, the securing element 8 engages in a recess 10 of an actuating rod 23 connected to the slide 15 and is secured there by the securing spring 12. The electric motor 5 then moves back to its initial position with its actuating unit 24.

The activation of the parking lock 1 (engagement) is performed by the solenoid 7. The securing element 8 retracts from the recess 10, thus allowing the parking lock 1 to be engaged by the actuating spring 3.

In the event that solenoid 7 fails and parking lock 1 is to be activated from the unlocked position nP, the following emergency locking mechanism is provided: The electric motor 5 moves from its locked position P to the unlocked position nP, in which the slide actuator 25 contacts the slide 15 as part of the actuating unit 24. The electric motor 5 moves beyond this and further pre-loads the actuating spring 3 until a control edge 14 of the actuating unit 24 contacts a coupling element 9. For this purpose, the coupling element 9 has a window 13 in which the control edge 14 can move freely between the locked position P and the unlocked position nP. If the actuating unit 24 is moved beyond the unlocked position nP, the control edge 14 and the coupling element 9 come into contact, so that the coupling element 9 is displaced to an emergency locking position Not-P. The coupling element 9 has a ramp 11 for emergency unlocking, which can only act on the securing element 8 and release it from the recess 10 in the emergency locking position Not-P. This releases the actuating spring 3. The actuating unit 24 moves back to the initial position.

In the other case, when the electric motor 5 fails and the parking lock 1 is to be activated from the unlocked position nP, the following emergency locking mechanism is provided: An emergency energy storage device (not shown), which can be small in contrast to the vehicle battery required to operate the electric motor 5, such as a capacitor, can release the solenoid 7. Since the actuating unit 24 is in the initial position except when the parking lock is disengaged, and thus in particular in the unlocked position nP, engagement of the parking lock 1 is always possible due to the lack of self-locking of the actuating unit 24.

The parking lock 1 according to the disclosure can thus always be activated, regardless of whether the solenoid 7 or the electric motor 5 fail. This redundant activation option means that a safe vehicle state can always be achieved even in vehicles with electromechanically activated parking locks, even in the event of a fault, if one of the two activation options fails.

REFERENCE NUMERALS

1 Parking lock
2 Pawl
3 Actuating spring
4 Actuating element
5 Electric motor
6 Electric motor shaft
7 Solenoid
8 Securing element
9 Coupling element
10 Recess
11 Ramp
12 Securing spring
13 Window
14 Control edge
15 Slide
16 Roller
17 Slide housing
18 Roller
19 Return spring
20 Locking tooth
21 Pawl back
22 Further spring
23 Actuating rod
24 Actuating unit
25 Slide actuator
a Pivot axis
s Linear axis
P Locked position
nP Unlocked position
Not-P Emergency locking position

The invention claimed is:

1. An electromechanical parking lock for a motor vehicle, comprising:
    a locking element for reversible engagement in a parking lock wheel,
    an actuating element that can be pre-loaded by an actuating spring in order to insert the locking element into the parking lock wheel,
    an electric motor with an actuating unit for moving the actuating element out of a locked position (P) against a spring force of the actuating spring into an unlocked position (nP),
    a securing spring that, in the unlocked position (nP), holds the actuating element pre-loaded in the unlocked position (nP) via a securing element, and a solenoid arranged to release the securing element so that the actuating element moves to the locked position (P), wherein the electromechanical parking lock has an emergency locking position (Not-P) in which the securing element is released by the electric motor without changing the state of the solenoid so that the actuating element moves to the locked position (P).

2. The electromechanical parking lock according to claim 1, wherein the electric motor has an electric motor shaft to which a coupling element can be connected which, when the solenoid is inoperable, releases the securing element by means of the electric motor when the actuating unit is displaced beyond the unlocked position (nP) into the emergency locking position (Not-P) of the electromechanical parking lock.

3. The electromechanical parking lock according to claim 2, wherein the securing element can be released via a ramp of the coupling element.

4. The electromechanical parking lock according to claim 2, wherein the coupling element is not loaded by moving the actuating unit between the locked position (P) and the unlocked position (nP) of the actuating element, and the actuating unit moves the coupling element when actuating beyond the unlocked position (nP).

5. The electromechanical parking lock according to claim 4, wherein the coupling element has a window in which a control edge connected to the electric motor shaft is arranged, which can move freely in the window when the actuating element moves between the locked position (P) and the unlocked position (nP), wherein the control edge acts on a body edge of the window in the emergency locking position (Not-P) of the electromechanical parking lock.

6. The electromechanical parking lock according to claim 1, wherein the actuating unit is not designed to be self-locking and that the actuating unit has a spindle drive with a spindle nut, wherein the spindle drive is spring-loaded in the locked position (P) of the actuating element.

7. A method for operating the electromechanical parking lock of claim 1, wherein the actuating unit is moved in a first operating mode only between the unlocked position (nP) and the locked position (P), and in that in the event of a malfunction of the solenoid the actuating unit, in a second operating mode, is moved by the electric motor into the emergency locking position (Not-P) of the electromechanical parking lock.

8. The method according to claim 7, wherein a direction of movement of the actuating unit from the unlocked position (nP) of the actuating element to the emergency locking position (Not-P) of the electromechanical parking lock is opposite to a direction of movement of the actuating unit from the unlocked position (nP) of the actuating element to the locked position (P) of the actuating element.

9. An electromechanical parking lock for a motor vehicle, comprising:
a locking element for reversible engagement in a parking lock wheel;
an actuating spring having a spring force;
an actuating element arranged to be pre-loaded by the actuating spring to insert the locking element into the parking lock wheel when the actuating element is in a locked position (P);
an electric motor with an actuating unit for moving the actuating element against the spring force out of the locked position (P) into an unlocked position (nP) of the actuating unit;

a securing element;
a securing spring arranged to hold the actuating element pre-loaded via the securing element in the unlocked position (nP);
a solenoid arranged to release the securing element so that the actuating spring moves the actuating element into the locked position (P); and
an emergency locking position (Not-P) in which, when the electromechanical parking lock is unlocked, the electric motor is arranged to release the securing element so that the actuating spring moves the actuating element into the locked position (P) without changing a state of the solenoid.

10. The electromechanical parking lock of claim 9 further comprising a coupling element, wherein:
the electric motor comprises an electric motor shaft connectable to the coupling element; and
when the solenoid is inoperable, the coupling element releases the securing element by means of the electric motor to displace the actuation unit beyond the unlocked position (nP) of the actuating element into the emergency locking position (Not-P) of the electromechanical parking lock.

11. The electromechanical parking lock of claim 10, wherein:
the coupling element comprises a ramp; and
the securing element can be released via the ramp.

12. The electromechanical parking lock of claim 10, wherein:
the coupling element is stationary when the actuating unit moves between the locked position (P) and the unlocked position (nP) of the actuating element; and
the coupling element is displaced when the actuating unit moves beyond the unlocked position (nP) of the electromechanical parking lock.

13. The electromechanical parking lock of claim 12 further comprising a control edge connected to the electric motor shaft, wherein:
the coupling element comprises a window with a body edge;
the control edge is arranged in the window;
the control edge can move freely in the window between the locked position (P) and the unlocked position (nP) of the actuating element; and
the control edge acts on the body edge in the emergency locking position (Not-P) of the electromechanical parking lock.

14. The electromechanical parking lock of claim 9, wherein:
the actuating unit is not designed to be self-locking; and
the actuating unit comprises a spindle drive with a spindle nut which is spring-loaded in the locked position (P).

15. A method for operating the electromechanical parking lock of claim 9, comprising:
moving the actuating unit to displace the actuating element only between the unlocked position (nP) and the locked position (P) in a first operating mode; and
after a malfunction of the solenoid, moving the actuating unit with the electric motor into the emergency locking position (Not-P) of the electromechanical parking lock.

16. The method of claim 15, wherein a movement direction for moving the actuating unit from the unlocked position (nP) of the actuating element to the emergency locking position (Not-P) of the electromechanical parking lock is opposite to a movement direction for moving the actuating unit from the unlocked position (nP) of the actuating element to the locked position (P) of the actuating element.

17. An electromechanical parking lock comprising:
a pivotable pawl comprising a locking tooth arranged for reversible engagement in a parking lock wheel;
an actuating spring;
an actuating element, displaceable by the actuating spring to pivot the locking tooth into engagement with the parking lock wheel;
an actuating unit for displacing the actuating element against the actuating spring to release the locking tooth from the parking lock wheel;
an actuating rod fixed to the actuating element, the actuating rod comprising a recess;
a securing spring;
a securing element, displaceable into the recess by the securing spring when the actuating element is displaced against the actuating spring to retain the actuating element;
a solenoid arranged to displace the securing element out of the recess to release the actuating element; and
a coupling element arranged to displace the securing element out of the recess to release the actuating element when the coupling element is displaced by the actuating unit.

18. The electromechanical parking lock of claim 17 wherein:
the coupling element comprises a window with a window edge; and
the actuating unit comprises a control edge displaceable in the window and arranged to contact the window edge to displace the coupling element to release the actuating element.

19. The electromechanical parking lock of claim 17 further comprising an electric motor, wherein:
the actuating unit comprises:
a spindle;
a spindle drive for displacing the actuating element; and
a spindle spring;
the electric motor is arranged to rotate the spindle to displace the spindle drive in a first direction to displace the actuating element against the actuating spring; and
the spindle spring is arranged to displace the spindle drive in a second direction, opposite the first direction.

* * * * *